US008794568B2

(12) United States Patent
Lafont et al.

(10) Patent No.: US 8,794,568 B2
(45) Date of Patent: Aug. 5, 2014

(54) AIRCRAFT ENGINE ATTACHMENT PYLON COMPRISING TWO FRONT WING SYSTEM ATTACHMENTS WITH ORTHOGONAL SHEARING PINS

(75) Inventors: Laurent Lafont, Pechbusque (FR); Frederic Journade, Toulouse (FR); Eric Renaud, Brignemont (FR)

(73) Assignee: Airbus Operations S.A.S., Toulouse (FR)

( * ) Notice: Subject to any disclaimer, the term of this patent is extended or adjusted under 35 U.S.C. 154(b) by 316 days.

(21) Appl. No.: 13/239,464

(22) Filed: Sep. 22, 2011

(65) Prior Publication Data

US 2012/0080554 A1    Apr. 5, 2012

(30) Foreign Application Priority Data

Oct. 1, 2010 (FR) ...................................... 10 57962

(51) Int. Cl.
*B64D 27/00* (2006.01)
(52) U.S. Cl.
USPC .......................................................... 244/54
(58) Field of Classification Search
USPC .......................................................... 244/54
See application file for complete search history.

(56) References Cited

U.S. PATENT DOCUMENTS

| 4,560,122 | A | * | 12/1985 | Parkinson et al. | 244/54 |
| 5,806,792 | A | * | 9/1998 | Brossier et al. | 244/54 |
| 7,451,947 | B2 | * | 11/2008 | Machado et al. | 244/54 |
| 7,963,479 | B2 | * | 6/2011 | Cazals | 244/54 |
| 2004/0129832 | A1 | * | 7/2004 | Marche | 244/54 |
| 2005/0178888 | A1 | * | 8/2005 | Machado et al. | 244/54 |
| 2008/0067286 | A1 | * | 3/2008 | Cousin et al. | 244/54 |
| 2008/0217467 | A1 | * | 9/2008 | Lafont | 244/54 |
| 2008/0223983 | A1 | * | 9/2008 | Lafont et al. | 244/54 |
| 2008/0315033 | A1 | * | 12/2008 | Diochon et al. | 244/54 |
| 2009/0212155 | A1 | * | 8/2009 | Huggins et al. | 244/54 |
| 2010/0193627 | A1 | * | 8/2010 | Lafont | 244/54 |

FOREIGN PATENT DOCUMENTS

| FR | 2 905 932 A1 | 3/2008 |
| WO | WO 2007/012667 A1 | 2/2007 |
| WO | WO 2009/037267 A1 | 3/2009 |

OTHER PUBLICATIONS

French Preliminary Search Report issued on Jun. 17, 2011 in the corresponding France Application No. 1057962.
U.S. Appl. No. 13/384,650, filed Jan. 18, 2012, Lafont.

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

An aircraft assembly comprising a wing and an engine attachment pylon fixed to the wing by an attachment comprising a first and a second front wing system cleat connecting a rigid structure of the attachment pylon and a front longeron of the wing. The first front wing system cleat comprises a first shearing pin oriented in the transversal direction to ensure take-up of forces exerted in the longitudinal and vertical directions of the pylon, and the second front wing system cleat comprises a second shearing pin oriented in the longitudinal direction to ensure take-up of forces exerted in the transversal and vertical directions of the pylon.

9 Claims, 9 Drawing Sheets

US 8,794,568 B2

AIRCRAFT ENGINE ATTACHMENT PYLON COMPRISING TWO FRONT WING SYSTEM ATTACHMENTS WITH ORTHOGONAL SHEARING PINS

TECHNICAL FIELD

The present invention relates to an aircraft engine attachment pylon intended to be inserted between an aircraft wing system and the concerned engine, and more particularly an assembly comprising this same pylon mounted on a wing of the aircraft.

This type of attachment pylon, or EMS (Engine Mounting Structure), makes it possible to suspend an engine below the wing system of the aircraft, or to mount said turboshaft engine above that same wing system.

The invention can be used on any type of aircraft preferably equipped with turbojet engines or turboprops.

BACKGROUND OF THE INVENTION

Such an attachment pylon is in fact provided to form the connecting interface between an engine and a wing of the aircraft. It makes it possible to transmit, to the structure of said aircraft, the forces generated by its associated engine, and also allows the conveyance of the fuel, the electrical, hydraulic and air systems between the engine and the aircraft.

FIG. 1 shows an engine assembly for an aircraft, as known from document WO 2009/037267. This engine assembly 1 is intended to be fastened under a wing 2 of said aircraft. It includes an attachment pylon or device 4, as well as an engine 6 such as a turbojet engine attached under said device 4.

Overall, the attachment device 4 includes a rigid structure 8, also called primary structure, supporting attachment means for the engine 6, these attachment means having a plurality of engine attachments 10, 12, as well as a device for taking up thrust forces 14 generated by the engine 6.

For information, it should be noted that the assembly 1 is intended to be surrounded by a nacelle (not shown), and that the attachment pylon 4 includes another series of fasteners (not shown) fastened on the rigid structure 8 and making it possible to suspend said assembly 1 under the wing 2 of the aircraft.

In the rest of the description that follows, by convention, X refers to the longitudinal direction of the pylon 4, which can also be likened to the longitudinal direction of the turbojet engine, said direction X being parallel to a longitudinal axis 5 of said turbojet engine 6. On the other hand, Y refers to the direction oriented transversely relative to the pylon 4 and also comparable to the transverse direction of the turbojet engine 6, and Z the vertical direction of the height, these three directions X, Y and Z being orthogonal relative to each other.

The terms "front" and "back" should be considered relative to a direction of travel of the aircraft encountered after the thrust exerted by the turbojet engine 6, said direction being shown diagrammatically by arrow 7.

FIG. 1, showing the prior art, shows the two engine attachments 10, 12, the take-up device for thrust forces 14, the rigid structure 8 of the attachment device 4, as well as a plurality of secondary structures fastened on the rigid structure 8. These secondary structures ensuring the segregation and maintenance of the systems while supporting aerodynamic fairing elements will be described below.

It is indicated that the turbojet engine 6 has, at the front, a fan case 18 with large dimensions delimiting an annular fan channel 20, and has, toward the back, a central case 22 with smaller dimensions, containing the core of said turbojet engine. The cases 18 and 22 are of course secured to each other.

As shown in FIG. 1, two engine attachments 10, 12 of the device 4 are provided, and are respectively called forward engine attachment and aft engine attachment. The forward engine attachment 10 is inserted between a forward end of the rigid structure 8, and an upper part of the fan case 18. The aft engine attachment 12 is inserted between the rigid structure 8 and the central case 22, or the gas exhaust case situated further back.

The rigid structure 8 makes it possible to convey forces between the turbojet engine and the wing system. It assumes the form of a box extending from back to front, substantially in direction X. This metal box is then traditionally formed by assembling upper and lower longerons and side panels connected to each other via transverse inner stiffening ribs (not visible in FIG. 1), which each assume the form of a rectangle oriented in plane YZ.

Still in reference to FIG. 1, the secondary structures of the pylon 4 include a forward aerodynamic structure 24, an aft aerodynamic structure 26, a connecting fairing 28 of the forward and aft aerodynamic structures, and a lower aft aerodynamic fairing 30, also called "shield" or "APF" (Aft Pylon Fairing).

More precisely, the forward aerodynamic structure 24 is placed in the lower forward extension of the wing 2 and above the primary structure 8. It is fixedly mounted on the rigid structure 8, and has an aerodynamic profile function between an upper part of the fan cowls hinged thereon, and the leading edge of the wing system. This forward aerodynamic structure 24 then has not only an aerodynamic fairing function, but also makes it possible to place, segregate and convey different systems (air, electric, hydraulic, fuel). Furthermore, the forward part of this structure 24 not being in contact with the rigid structure 8, a heat exchanger is usually inserted in the space defined between these two elements.

Directly in the rear extension of said structure 24, still under the wing system and mounted above the rigid structure 8, is a connecting fairing 28, also called "karman." Then, still toward the rear, the connecting fairing 28 is extended by the aft aerodynamic structure 26, which contains part of the equipment of the pylon. This structure 26 is preferably situated completely behind relative to the rigid structure 8, and is therefore attached under the wing of the aircraft.

Lastly, under the rigid structure 8 and the aft aerodynamic structure 26 is the lower aft aerodynamic fairing 30, also called "shield" or "Aft Pylon Fairing." Its essential functions are the formation of a thermal barrier, also called firewall, serving to protect the pylon and the wing system from the heat given off by the primary flow, and the formation of an aerodynamic continuity between the output of the engine and the attachment pylon. In a known manner, the aforementioned fairing 30 includes a heat protection floor 32 provided with an outer surface intended to be hugged by a primary flow of the engine that it partially delimits, radially outwardly, this primary flow escaping the hose 33 of the engine being diagrammatically shown by arrow 36. Moreover, the fairing 30 also includes two side panels 44, which are provided to be outwardly hugged by a secondary flow from the engine diagrammatically shown by arrow 38, due to their installation in the annular secondary flow channel 40 of the engine, and/or as output therefrom.

It should be noted that in the described preferred embodiment where the engine 6 is intended to be suspended under the wing system of the aircraft, the heat protection floor 32 for protecting the pylon and the wing system from the primary flow 36 forms a lower portion of the fairing 30. Naturally, this floor constitutes an upper portion of the fairing in the alternative case where the engine is intended to be installed above the wing system.

Lastly, as shown in FIG. 1, it is provided that the forward end of the floor 32 hugs the upper aft end of the hose 33, or it is brought much closer to said same aft end of the hose 33.

As mentioned above, the pylon is equipped with a plurality of wing system attachments constituting attachment means for attaching the rigid structure on the wing. One embodiment of these attachment means is disclosed in document FR 2 887 522. They generally include two forward attachments each taking up forces in direction Z, an intermediate attachment called a spigot attachment, taking up forces in directions X and Y, and an aft attachment taking up forces in directions Z and Y.

Although the solution described above enables a satisfactory transmission of the static and dynamic forces created by the engine under all flight conditions, it nevertheless has non-negligible drawbacks.

In fact, on the turboshaft engines of recent aircrafts, the high dilution level sought leads to obtaining an extremely high bulk, since increasing the dilution level inevitably leads to an increase in the diameter of the engine, and more particularly an increase in the diameter of its fan case.

Thus, with a ground clearance that is naturally set so as to remain acceptable from a safety perspective, the space remaining between the wing and the turboshaft engine serving to house the rigid structure of the attachment pylon as well as its different attachments is more and more limited, while paradoxically, the forces to be taken up are of course increasingly high.

This evolution of turboshaft engines has had the harmful consequence of imposing a reduction of the vertical dimensions of the rigid structure of the attachment pylon, in particular so as to be able to keep sufficient space to place the component elements of the intermediate attachment, the large dimensions of which are imposed by the need to take up thrust forces from the turboshaft engine, i.e. those oriented in the longitudinal direction of said turboshaft engine.

Furthermore, providing four distinct wing system attachments inevitably leads to a high overall mass for the attachment pylon.

BRIEF DESCRIPTION OF THE INVENTION

The invention therefore aims to at least partially resolve the aforementioned drawbacks, relative to the prior art embodiments.

To that end, the invention relates to an aircraft assembly comprising a wing and an engine attachment pylon fixed to the wing by means of attachment means comprising a first and a second front wing system cleat connecting a rigid structure of the attachment pylon and a front longeron of the wing, the latter being inclined relative to each of the longitudinal and transverse directions of the pylon.

According to the invention, said first wing system cleat comprises a first shearing pin oriented in the transversal direction to ensure take-up of forces exerted in the longitudinal and vertical directions of the pylon, and the second front wing system cleat comprises a second shearing pin oriented in the longitudinal direction to ensure take-up of forces exerted in the transversal and vertical directions of the pylon.

Advantageously, the design of the attachment means according to the invention is simplified relative to that found in the prior art embodiments, primarily due to the fact that intermediate cleats of the spigot cleat type are no longer necessary, since the longitudinal forces are taken up by one of the two front wing system cleats, using a shearing pin transversely oriented.

Thus, eliminating this intermediate cleat advantageously creates a decrease in the mass and bulk relative to the attachment means, and consequently a non-negligible decrease in the overall mass and the cost of the attachment pylon.

Moreover, the decreased bulk makes it possible to come closer to the rigid structure of the attachment pylon of the lower part of the wing.

As a result, for a given spacing between an aircraft engine and its associated wing, the space allocated to arranging the rigid structure of the attachment pylon is substantially greater than that found in the assemblies of the prior art, in which part of the free space between the engine and the wing was specifically dedicated to the installation of the spigot intermediate cleat.

The assembly according to the invention consequently allows an increase in the dimensions of the rigid structure of the attachment pylons, thereby making it possible to make them better adapted to the significant forces they must take up.

Preferably, said second front wing system cleat comprises a pylon fitting secured to the rigid structure, a housing fitting for the pin secured to the front wing longeron and arranged between said front longeron and said pylon fitting, as well as a fitting for keeping the pin attached on the front wing longeron and arranged so that said pylon fitting is situated between said housing fitting of the pin and said maintenance fitting of the pin, these three fittings being passed through by said second shearing pin. Advantageously, the presence of the maintenance fitting prevents the pin from working in cantilever.

Preferably, said pin maintenance fitting is oriented substantially in the transverse direction parallel to the pylon fitting, and it is fixed to the front wing longeron directly at one of its ends, and indirectly at the other of its ends, via a connecting fitting. The latter is preferably oriented substantially in the longitudinal direction.

Preferably, the rigid structure comprises a box, as well as transverse stiffening ribs of the box fixed on said box and spaced apart from each other along the latter while being outwardly arranged relative to said box that they surround, and said pylon fitting is made in a single piece with one of said transverse ribs. Of course, this fitting could alternatively be attached on the stiffening rib, without going beyond the scope of the invention.

Preferably, said second front wing system cleat comprises an additional housing fitting for the pin secured to the front wing longeron, and arranged so that the latter is situated between said housing fitting of the pin and said additional housing fitting of the pin. The pin therefore successively passes through the housing fitting of the pin, the front wing longeron, and the additional housing fitting of the pin. Thus, if the housing fitting fails, the forces traveling through the pin can be transmitted to the front wing longeron via the additional housing fitting for the pin, which therefore performs a so-called "failsafe" safety function here.

Preferably, said attachment means also comprise a rear wing system cleat ensuring taking-up of the forces exerted in the transverse and vertical directions of the pylon, and said attachment means are exclusively formed by the two front wing system cleats and the rear wing system cleat. This makes it possible to impart an isostatic nature to the attachment means, since each of the three cleats takes up forces in two different directions.

The invention also relates to an aircraft comprising at least one assembly as described above, as well as an engine mounted on the pylon of said assembly, said engine preferably being of the turbojet engine or turboprop type.

Other advantages and features of the invention will appear in the detailed non-limiting description below.

BRIEF DESCRIPTION OF THE DRAWINGS

This description will be done in light of the appended drawings, among which:

FIG. 5b shows a cross-sectional view along line Vb-Vb of FIG. 5a;

FIG. 5c shows a side view of that shown in FIG. 5a;

DETAILED DESCRIPTION OF PREFERRED EMBODIMENTS

Figure 2:
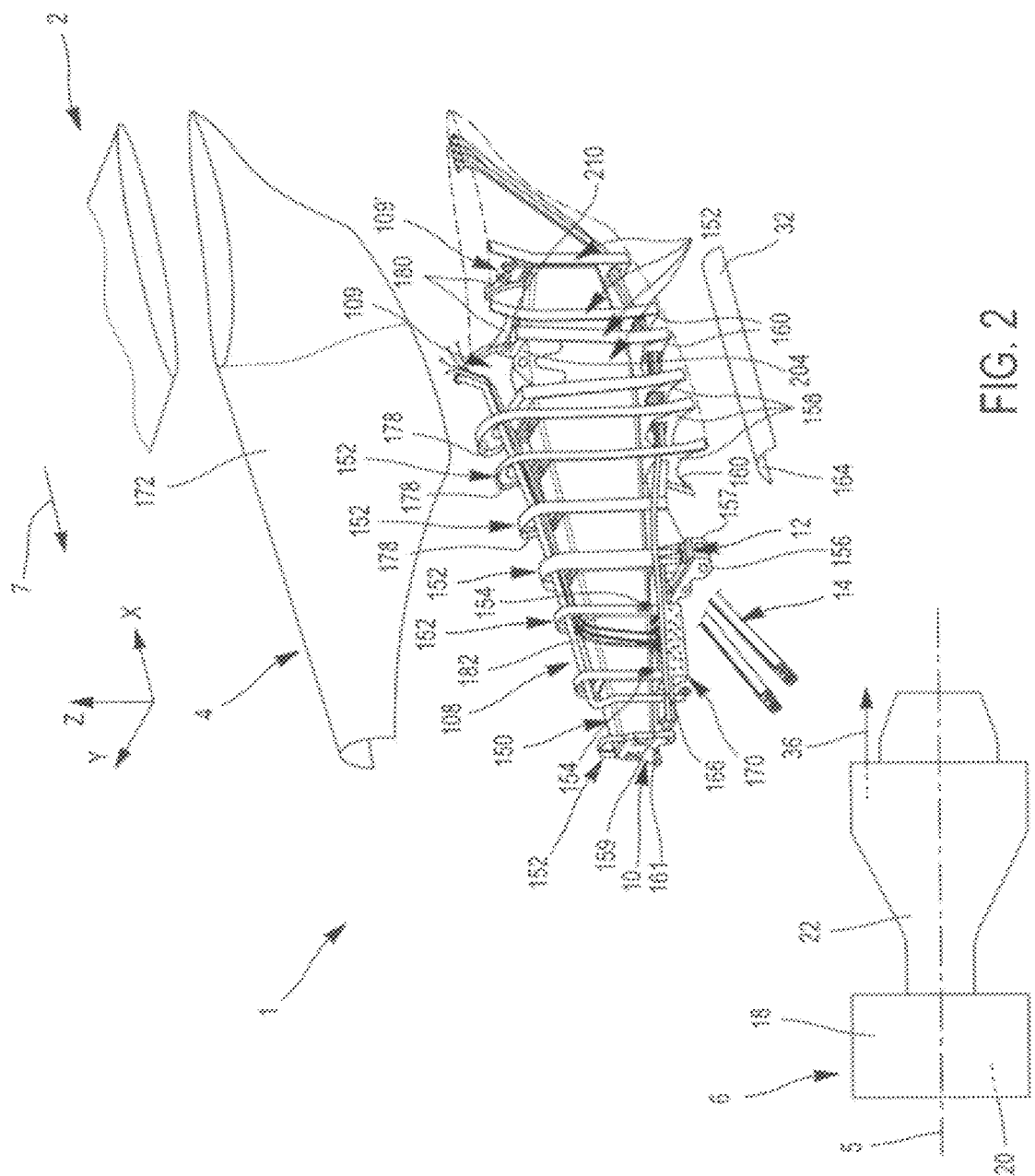
FIG. 2 shows an exploded perspective view of an aircraft engine assembly, comprising an attachment pylon intended to be an integral part of an assembly according to one preferred embodiment of the present invention.

FIG. 2 shows an exploded view of an aircraft engine assembly intended to be fastened under a wing 2 of said aircraft, this assembly 1 including an attachment device 4 intended to be an integral part of an aircraft assembly according to one preferred embodiment of the present invention.

Figure 1:
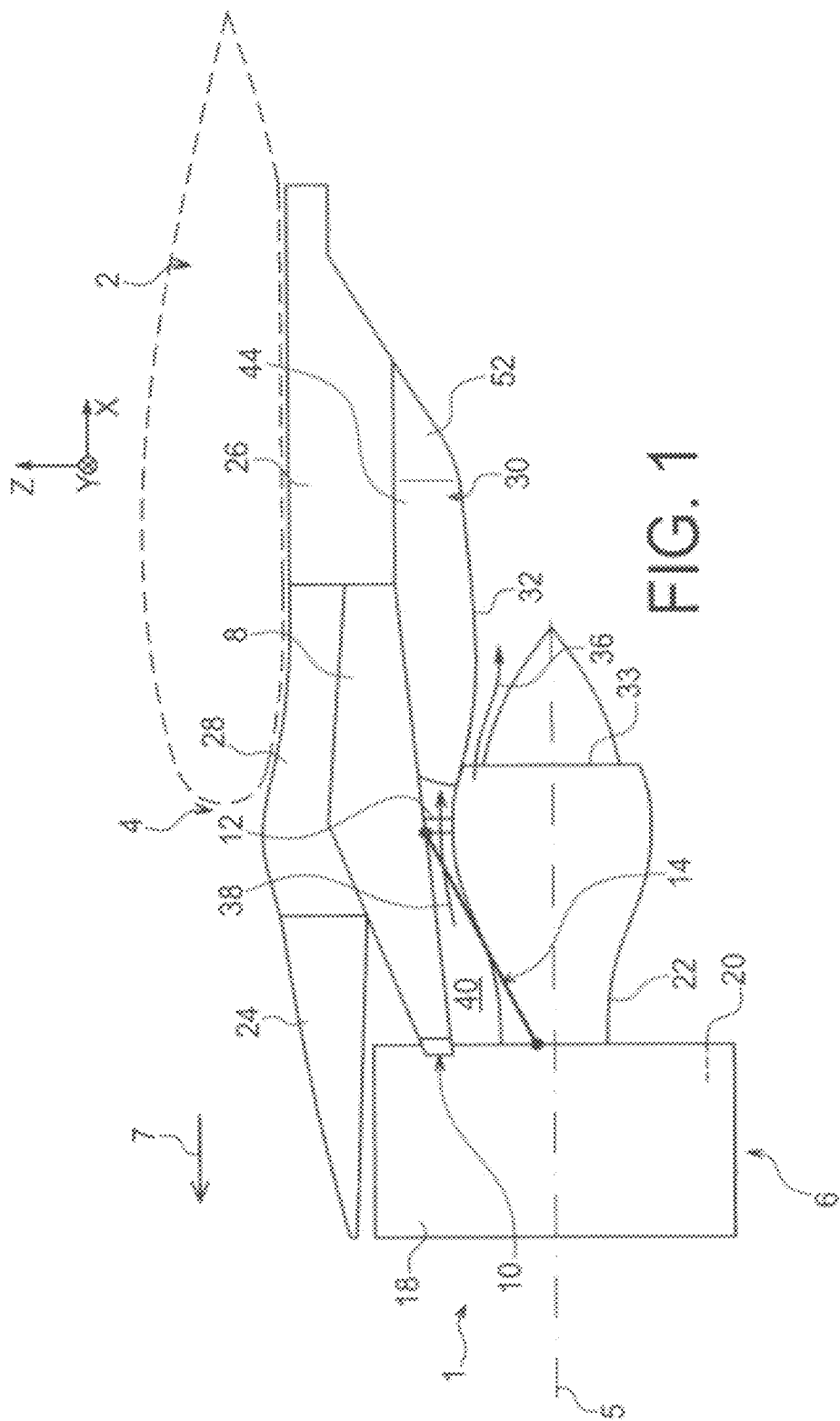
FIG. 1, already described, shows a diagrammatic side view of an aircraft engine assembly, comprising a traditional attachment pylon of the prior art.

In this assembly 1, which also includes an engine 6 such as a turbojet engine attached under the device 4, certain elements are identical or similar to those of the prior art assembly shown in FIG. 1. In this respect, in the figures, elements bearing the same numbers correspond to identical or similar elements.

The attachment pylon 4 includes a rigid structure 108, also called primary structure, bearing attachment means for the engine 6, these attachment means having a plurality of engine attachments 10, 12 (each shown in part only in FIG. 2), as well as a take-up device for thrust forces 14 generated by the engine 6.

For information, it should be noted that the assembly 1 is intended to be surrounded by a nacelle (not shown), and that the attachment pylon 4 has another series of attachments 109, 109' attached on the rigid structure 108 and making it possible to ensure the suspension of said assembly 1 under the wing/wing system 2 of the aircraft. Each of the wing system cleats 109, 109' is also shown only partially in FIG. 2. Nevertheless, the front wing system cleats 109, 109, specific to the present invention, will be described in more detail later, in reference to FIGS. 5a to 5c.

Two engine attachments 10, 12 of the pylon 4 are provided, and respectively called forward engine attachment and aft engine attachment. The forward engine attachment 10 is inserted between a front end of the rigid structure 108 and an upper part of the fan case 18, whereas the aft engine attachment 12 is inserted between the rigid structure 8 and the central case 22, or the exhaust case situated further back.

Furthermore, the take-up device for thrust forces 14, traditionally comprising two connecting rods that are symmetrical relative to a median vertical and longitudinal plane of the pylon, is inserted between a radially inner part of the fan case, also called intermediate case, and the rear cleat 12 on which these connecting rods are hinged, via a rudder bar as is known by those skilled in the art.

In this preferred embodiment of the present invention, the rigid structure 108 first comprises a box 150 extending globally in the direction X. The box is formed from a single hollow segment made in a single piece of composite material, of the resin and carbon fiber and/or glass mixture type, for example CFRP (Carbon Fiber Reinforced Plastic).

The production of this type of box can be easy and varied. It for example consists of arranging plies of composite material on a male mold, then placing the set of plies inside a light female mold, which will guarantee a precise shape for the outer surface of the box. The latter is obtained by applying fluidic pressure inside the box, which fulfills the role of compacting force against the inner surface of the box placed in a suitable furnace.

Naturally, the stacking of plies can include stiffeners, localized at predetermined locations of the box, whereof the inner surface does not require any particular finishing. Thermoplastic stiffeners can also be joined on the box after the formation thereof, on its outer surface and/or its inner surface. Nevertheless, it is preferably provided that the inside of the box 150 remains empty. It is in particular free of transverse stiffening ribs which, here, are provided outside the box, as will be detailed later.

The box 150 has a substantially square or rectangular transverse section, with corners that may be slightly rounded, which facilitates its production in a composite material. Furthermore, as will be mentioned later, transverse stiffening ribs surround and hug the outer surface of the box. As a result, ribs incorporating a substantially square/rectangular frame that hugs the box can then have reinforced zones at the corners thereof, since they can incorporate material to fill in the outer spaces left empty by the rounded corners of the box. The stiffness of the ribs is thereby strengthened.

As shown in FIG. 2, the box 150 has a section of maximum size at the two forward wing system cleats 109, 109 it supports. From this maximum-size region, the box extends longitudinally both over a small distance rearward, and over a larger distance forward, with a section having a decreasing size, and of course in a single piece, although two longitudinal sections could be considered without going beyond the scope of the invention.

As mentioned above, the rigid structure 108 is completed by a plurality of transverse stiffening ribs 152 of the box, outwardly fastened on the box 150 that they surround by fitting the outer surface thereof. Moreover, they are spaced apart from each other in direction X.

Each of these ribs 152, oriented in a plane YZ, preferably has a square/rectangular frame whereof all four corners respectively hug the upper and lower posts as well as the two lateral flanks of the box. In this way, each of them surrounds the single box segment, on which they are fastened by welding, bolting, or by any other traditional technique available to those skilled in the art. Before being fastened on the box, each rib 152 is inserted from an end of the box with a smaller section, then moved relative thereto until its frame bears on the outer surface of the box, at its permanent location. At this stage, before or after fastening of the rib on the box, the latter can be thermoplastically readjusted to enable correct assembly on the rib, while being hot reshaped directly on the outer transverse rib.

Although they are an integral part of the primary structure 108, the ribs 152, preferably metal, are cleverly used to support one or more other pieces of equipment of the pylon, or of the nacelle intended to surround the engine. They therefore have support means for supporting said equipment, preferably made in a single piece with the ribs.

One can thus see that two of the forward ribs 152 have, at the lateral sides of their frame, support means 154 for the articulated nacelle cowls (not shown), these means 154 assuming the form of fittings pierced in direction X so as to be able to house the appropriate hinges.

One of the forward ribs 152 has, at the lower side of its frame, support means 156 for the aft engine attachment 12. These means 156 assume the form of a support plate oriented downward, on which a fitting 157 is bolted forming an integral part of the aft engine attachment 12. In a manner known by those skilled in the art, the aft engine attachment is completed by another fitting (not shown) secured to the central case 22 of the engine or made in a single piece therewith, connected to the fitting 157 via connecting rods and/or clevises articulated on each of the two fittings.

Similarly, the rib 152 furthest forward has, at the lower side of its frame, support means 159 for the forward engine attachment 10. These means 159 assume the form of a support plate oriented downward, on which a fitting 161 is bolted forming an integral part of the forward engine attachment 10. In a manner known by those skilled in the art, the forward engine attachment is completed by another fitting (not shown) secured to the fan case 18 of the engine or made in a single piece therewith, connected to the fitting 159 via connecting rods and/or clevises articulated on each of the two fittings.

Furthermore, the box 150 supports, at its back end, a rib 152 equipped with support means (not referenced) for a rear wing system cleat 109'. These means assume the form of a support plate oriented upward, corresponding to the upper side of the frame of the rib 152. Bolted on this support plate is a fitting that is an integral part of the wing system cleat, although an alternative consisting of producing the rib and this fitting as a single piece is within the scope of the invention. In a manner known by those skilled in the art, the rear wing system cleat 109' is completed by another fitting (not shown) secured to the wing or made in a single piece therewith, connected to the first fitting by connecting rods and/or clevises hinged on each of the two fittings.

Furthermore, several aft ribs 152 have, at the lower side of their frame, support means 158 for a heat protection floor 32. These means assume the form of a downward rib extension, which ends with a convex surface 160 for receiving the floor 32 with a complementary shape, the outer surface 164 of which is intended to be hugged by a primary flow 36 of the engine. With this arrangement, the fairing 30 used in the prior art, called APF, is advantageously no longer required.

The ribs 152 also have, at the lower side of their frame, support means 166 for a ventilated system 170 for thermal protection of the box. These means 166 can assume different forms, for example a fastening plate, on which the ventilated system 170 is mounted globally assuming the form of a pipe extending longitudinally from one end to the other of the box, under the lower post thereof. This pipe can also pass through the lower rib extension 158 of one or more aft ribs 152, as shown in FIG. 2.

By being passed through by a cool fluid circulating in the downstream direction, this pipe, known in itself, therefore performs a heat protection function for the box relative to the heat given off by the engine.

Lastly, the ribs 152 have support means for an aerodynamic skin of the pylon, referenced 172 in FIG. 2. These support means correspond to the edges of the ribs, which offer a support surface for the skin 172. In the illustrated preferred embodiment, the skin 172, possibly obtained by assembling panels, is provided to make up the aerodynamic surface of all of the aerodynamic fairings found in the prior art shown in FIG. 1, i.e. the forward aerodynamic structure 24, the aft aerodynamic structure 26, the connecting fairing 28 and the lower aft aerodynamic fairing 30. The skin 172 is therefore provided to cover, remotely, all of the upper post and the lateral flanks of the box 150.

Thus, the forward ribs have an upper extension 178 with an outwardly curved shape, called arched, to match the identical shape of the upper parts of the forward aerodynamic structure 24 and the forward portion of the connecting fairing 28. The aft ribs have an upper extension 180 with an inwardly curved shape, called hollowed, to match the identical shape of the upper parts of the aft aerodynamic structure 26 and the aft portion of the connecting fairing 28. As shown in FIG. 2, the upper extension 178 of the forward ribs 152 is concave to receive the skin portion 172 with a complementary shape, while the upper extension 180 of the aft ribs 152 is convex to receive the skin portion 172 with a complementary shape, or to directly receive the lower surface of the wing 2 with a complementary shape.

Furthermore, the upper extension 178 of the forward ribs, in an arched shape, can be passed through by a pylon pipe, for example a heat exchanger pipe 182, traveling along the upper post of the box 150.

Figure 2A:
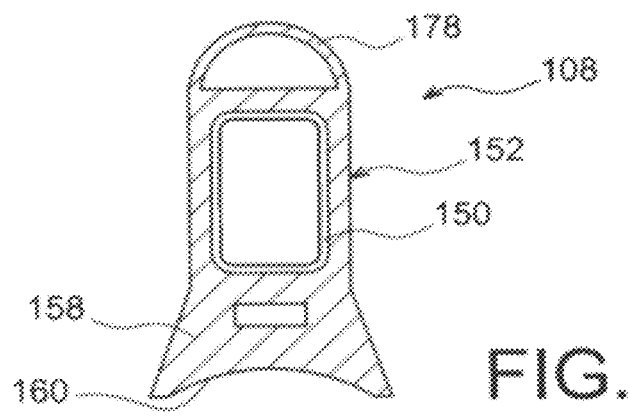
FIG. 2a shows a transverse cross-sectional view of the rigid structure of the attachment pylon equipping the assembly shown in FIG. 2, the cross-section passing through one of the transverse stiffening ribs.

FIG. 2a shows the box 150 made in a single piece of a composite material, with a substantially rectangular transverse section, with rounded corners. Each rib 152 hugs, with its frame, the outer surface of this box, over the entire perimeter thereof. In other words, the frame of the rib inwardly defines a contact surface following a closed line, on which the box is in contact, and on which it can be hot reshaped after its manufacture, owing to its thermoplastic properties.

As shown in FIG. 2a, all four corners of the frame of the rib have a reinforced mechanical strength, due to the presence of material filling in the spaces left free by the rounded corners of the box, hugged by these frame corners. Advantageously, the mechanical strength of the entire rib is increased.

Figure 2B:
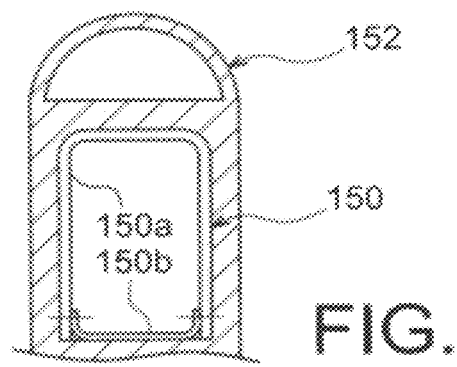
FIGS. 2b and 2c show views similar to that of FIG. 2a, in which the rigid structure assumes the form of two alternative embodiments, respectively.

FIG. 2b shows a first alternative embodiment for manufacturing the box 150, which is no longer made in a single piece, but obtained by assembling a lower longeron 150b made from a titanium alloy, and a U-shaped upper portion 150a made in a single piece with a composite material. Here, the U-shaped structure therefore forms the upper post of the box, as well as its lateral flanks. The lower longeron 150b forming the lower post of the box makes it possible, owing to the titanium alloy, to better withstand the heat given off by the engine opposite which it is located. The assembly of the U-shaped upper structure 150a on the lower longeron 150b can be done traditionally, for example by bolting.

Figure 2C:
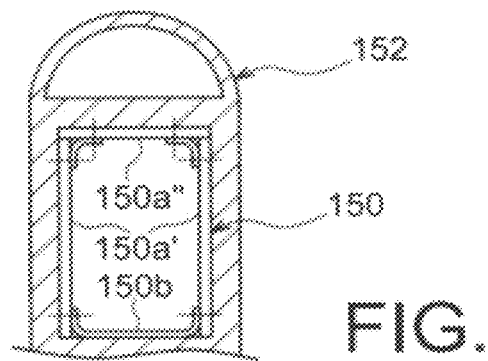

FIG. 2c shows a second alternative embodiment, resulting from the first since it consists of making the U-shaped upper structure using two lateral panels 150a' and an upper longeron 150a" fastened together, and each made from a composite material.

Figure 3:
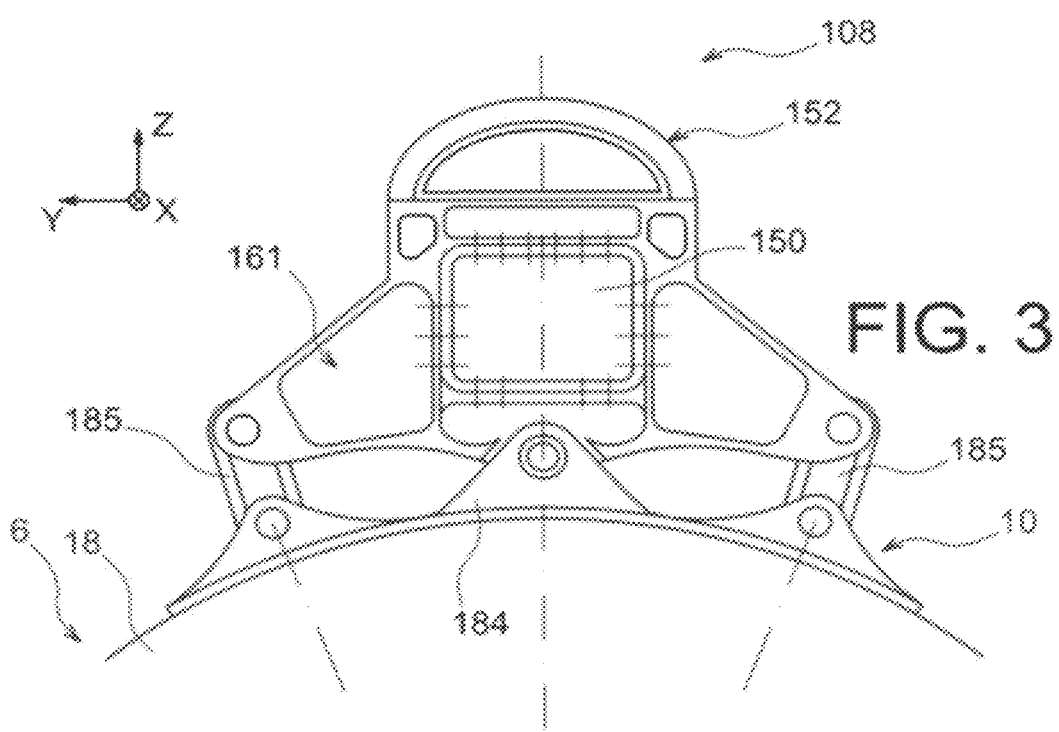
FIG. 3 shows a front view of a front part of the rigid pylon structure, in which the forward engine attachment is designed according to an alternative embodiment.

FIG. 3 shows a forward part of the rigid pylon structure, on which the forward engine attachment 10 is designed according to one alternative embodiment. In fact, it is provided here that the rib 152 furthest forward of the rigid structure is made in a single piece with the fitting 161 forming part of the engine attachment 10. This fitting 161 extends laterally on either side of the rib frame 152, and also downward from the lower side of said frame. It supports a plurality of connecting rods/clevises 185 that are mounted at one of their ends, preferably hingedly, on said fitting 161, and which are mounted at their other end, preferably also hingedly, on another fitting 184 secured to an upper part of the fan case 18, or made in a single piece therewith. Here, two connecting rods/clevises 185 are provided, respectively mounted at the lateral ends of the attachment 10. Furthermore, the central part of the fitting 161 is also hingedly mounted on a central part of the fitting 184. This mounting is preferably of the "pending" type, i.e. the forces do not travel through in a normal configuration, but only in the backup configuration when one of the two lateral parts of the attachment 10 is damaged. This central part therefore performs a so-called safety function, also called failsafe. The hinge pins here are oriented in direction X.

Figure 4:
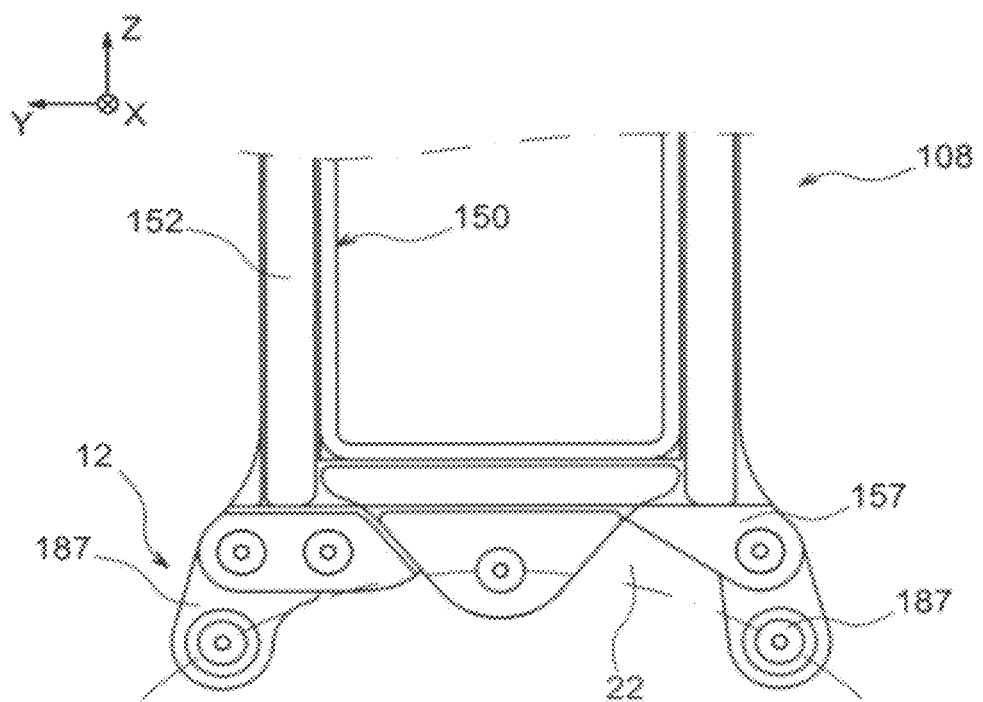
FIG. 4 shows part of the rigid pylon structure, in which the aft engine attachment is designed according to an alternative embodiment.

Similarly, FIG. 4 shows a part of the rigid structure on which the aft engine attachment 12 is designed according to an alternative embodiment. In fact, it is provided here that one of the ribs 152 is made in a single piece with the fitting 157 forming part of the engine attachment 12. This fitting 157 extends essentially downward from the lower side of the rib frame 152. It supports a plurality of connecting rods/clevises 187 that are mounted at one of their ends, preferably hingedly, on said fitting 157, and which are mounted at their other end, preferably also hingedly, on another fitting (not shown) secured to an upper part of the central case 22, or made in a single piece therewith. Here, two connecting rods/clevises 187 are provided, respectively mounted at the lateral ends of the attachment 12. Moreover, the central part of the fitting 157 is also hingedly mounted on a central part of the fitting fastened on the case 22. This mounting is preferably of the "pending" type, i.e. the forces do not travel through in a normal configuration, but only in the backup configuration when one of the two lateral parts of the attachment 10 is damaged. This central part therefore performs a so-called safety function, also called failsafe. The hinge pins here are oriented in direction X.

Figure 5A:
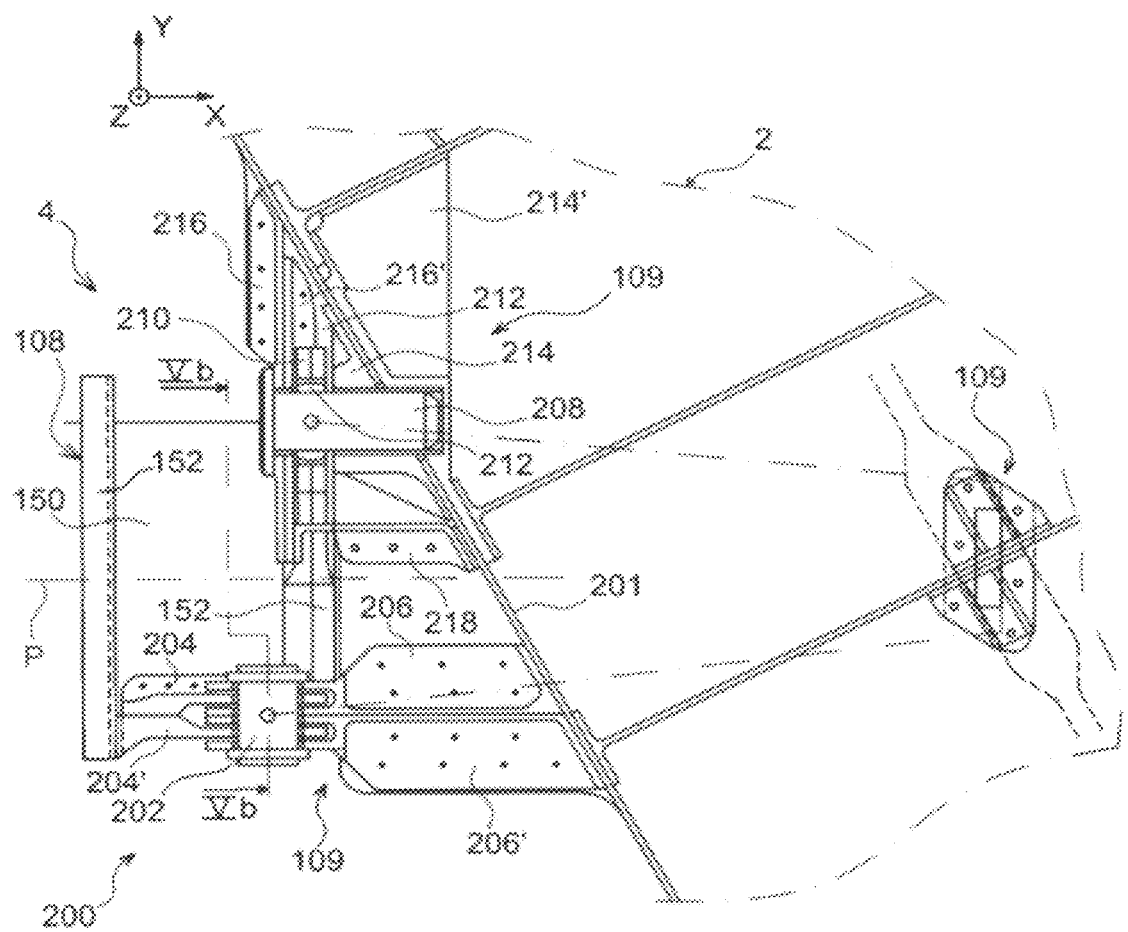
FIG. 5a shows an enlarged top view of part of the rigid pylon structure and of the wing, showing the forward wing system cleats.
Figure 5B:
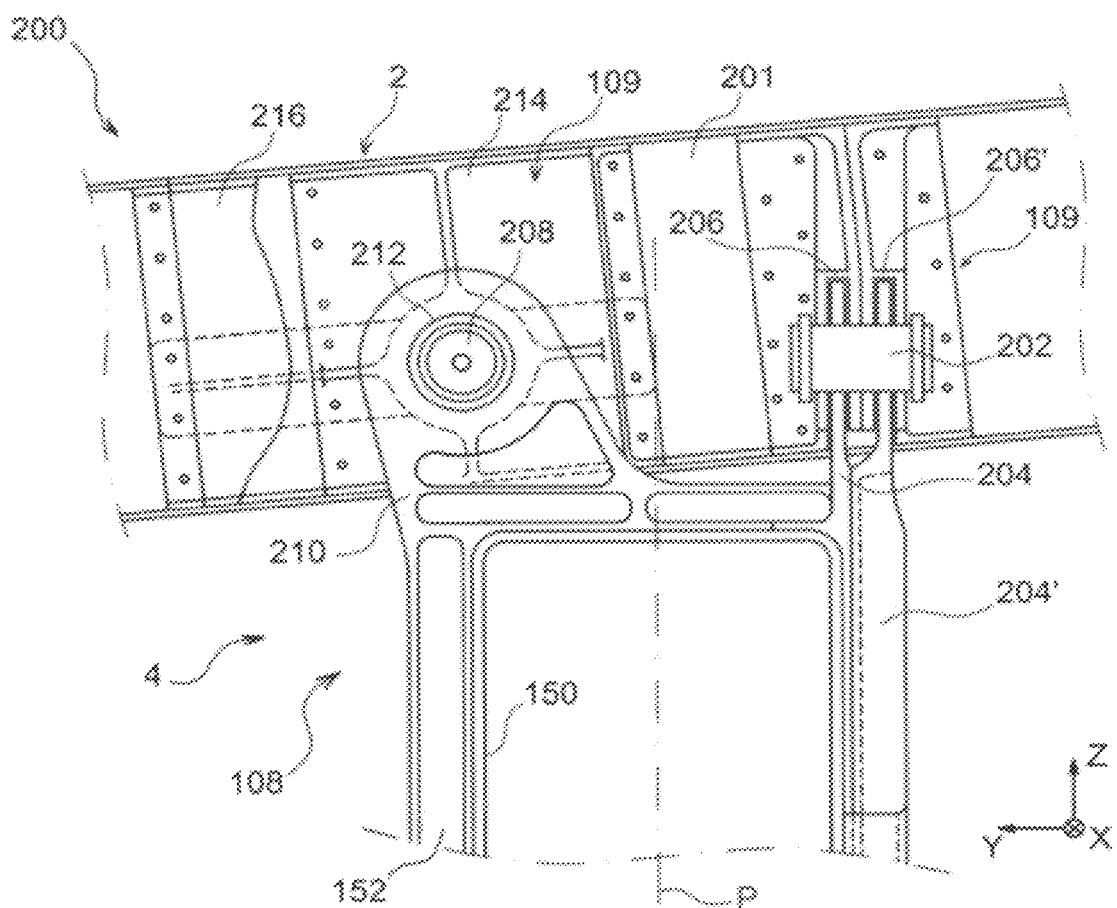
Figure 5C:
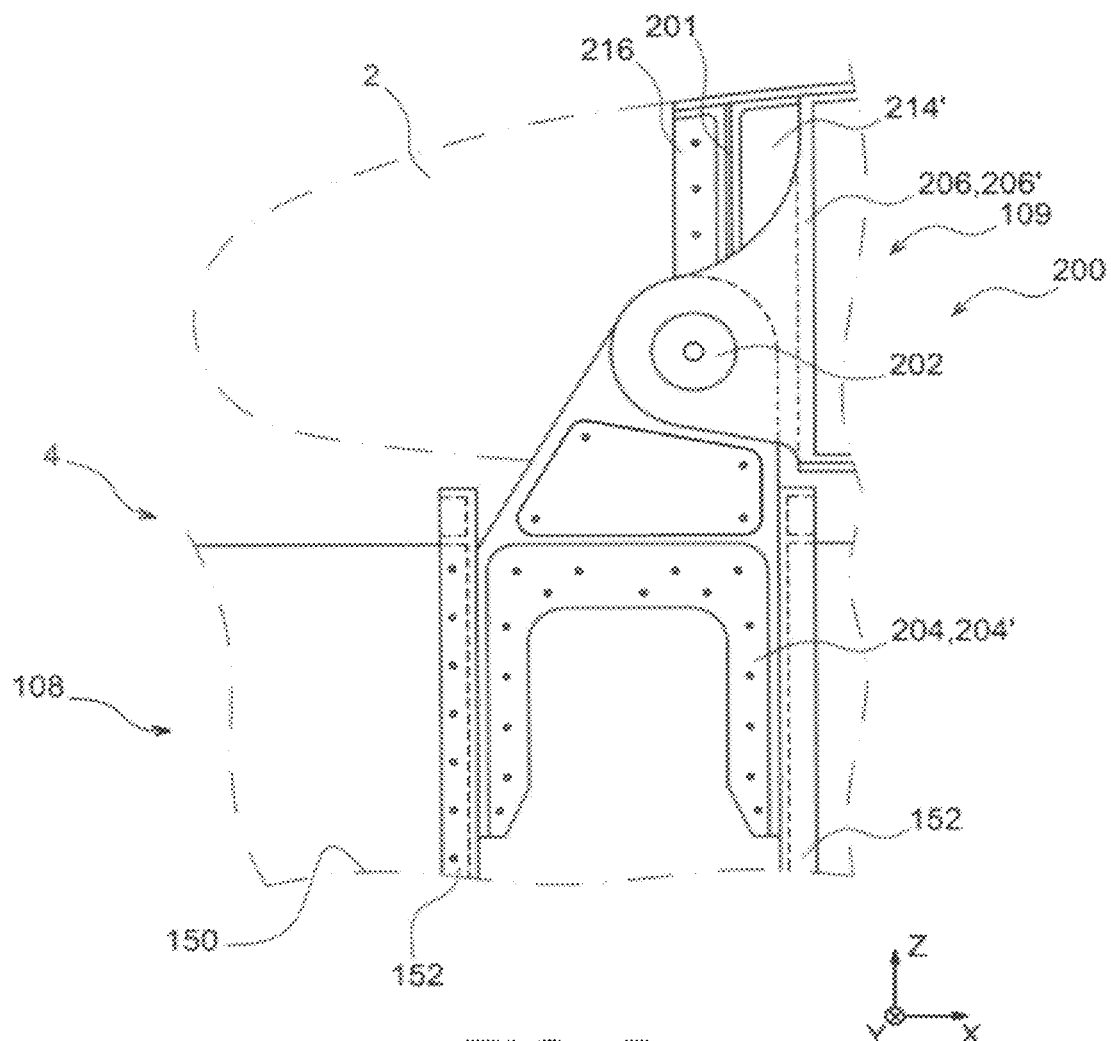

FIGS. 5a to 5c show an assembly 200 comprising the pylon 4 and the wing 2, in which assembly the two forward wing system cleats 109, 109 are made according to a specificity of the present invention.

Here, the attachment means for attaching the rigid structure 108 on the wing 2 are formed by the two forward wing system cleats 109, 109 and by the aft wing system cleat 109'. The latter, which is connected on a part of the wing arranged behind relative to the forward wing spar 201, assumes a conventional form already partially described above, of the type formed by assembling fittings and clevises/connecting rods. It will therefore not be described further.

The two forward attachments 109, 109 are not symmetrical here, but still arranged on either side of the vertical and longitudinal median plane P of the pylon. They are preferably passed through by a same fictitious transverse plane of the pylon.

The first forward attachment 109, shown at the bottom of FIG. 5a, has a first shearing pin 202 oriented in direction Y. It also integrates a pylon fitting 204 attached on a lateral blank of the box 150, between two ribs 152, and protrudes upward from the upper post of the box. The protruding part, oriented in a plane XZ, defines an orifice passed through by the pin 202. As shown in FIGS. 5a to 5c, for safety reasons, the pylon fitting 204 can be doubled by an additional pylon fitting 204', which therefore performs a failsafe function. The fitting 204' is for example fastened superimposed on the fitting 204, in direction Y. It is also passed through by the pin 202. One and/or the other of these fittings 204, 204' are preferably also fastened on the lateral sides of the frames of the two ribs between which they are located, as is better visible in FIG. 5c.

Moreover, this forward wing system cleat comprises a wing fitting 206, substantially oriented in a plane XZ, and fixedly attached on the forward longeron 201. It therefore protrudes forward relative to the latter, up to a forward end in the form of a yoke housing the rear end of the pylon fitting 204, and also being passed through by the pin 202. Here also, for safety reasons, the wing fitting 206 can be doubled by an additional wing fitting 206', which therefore performs a failsafe function. The fitting 206' is for example attached superimposed on the fitting 206, in direction Y. Its front end, in the shape of a yoke, which houses the rear end of the fitting 204', is also passed through by the pin 202.

The second forward attachment 109, shown at the top of FIG. 5a, has a second shearing pin 208 oriented in direction X. It also integrates a pylon fitting 210 secured to the rigid structure, which is preferably made in a single piece with one of the stiffening ribs 152. In fact, this fitting 210, pierced with an orifice passed through by the pin 208, extends from the upper side of the frame of the rib 152, in a plane YZ. It also supports a ball joint 212 establishing the mechanical connection with the shearing pin 208.

The attachment 109 also includes a housing fitting for the pin 214 secured to the forward longeron 201. It is fastened on the forward longeron 201 by bolting, at the front thereof. It therefore has a rear support surface on the longeron 201, which is inclined in a same direction as the latter, i.e. in both directions X and Y. Furthermore, it has a front surface fitting into a plane YZ facing the pylon fitting 210. It is passed through by a pin housing orifice, making it possible to embed said pin in the fitting 214.

Thus, this pin housing fitting 214 is arranged between the forward longeron 201 and the pylon fitting 210, in direction X. For safety reasons, an additional housing fitting for the pin 214' is also provided, visible in FIG. 5a. It is secured to the forward longeron 201, bolted thereon so that said longeron is situated between the two fittings 214, 214'. Moreover, it has a pin housing orifice situated in the continuation of the orifice formed in the longeron 201, which in turn is located in the continuation of the orifice of the fitting 214. The pin 208 therefore successively passes through the housing fitting of the pin 214, the forward longeron 201, and the additional housing fitting of the pin 214'. As a result, in the event the fitting 214 fails, the forces passing through the pin 208 can be transmitted to the forward wing spar via the additional housing fitting of the pin 214', which performs a safety function, called failsafe. It must therefore be considered that the pin 208 is engaged in each of the fittings 214, 214'.

To prevent the pin 208 from being cantilevered on the fitting 214, a fitting is also provided for keeping the pin 216 arranged so that the pylon fitting 210 is situated between the housing fitting of the pin 214 and the maintenance fitting of the pin 216. The fitting 216 is oriented substantially in a plane YZ, parallel to the pylon fitting 210 that it faces. It is fastened to the forward longeron 210 directly at one of its ends, preferably by bolting, and indirectly at the other of its ends, via a connecting fitting 218. The latter, which is preferably oriented substantially in direction X, is provided to offset the incline of the forward longeron 201 in direction Y. Thus, the fittings 216, 218 and the forward longeron 201 form a right angled triangle in which the fittings 210, 214 fit, and which is passed through by the pin 208 successively passing through the fitting 216, the fitting 210, the fitting 214, the longeron 201 and the fitting 216'. In that respect, it is indicated that the fitting 216 can also be doubled by an additional pin maintenance fitting 216', still for safety reasons. This fitting 216' is then fastened superimposed on the fitting 216, in direction X.

With these different arrangements, the bottom forward wing system cleat 109 makes it possible to take up forces exerted in directions X and Z, while the top ones make it possible to take up forces exerted in directions Y and Z. Moreover, the aft wing system cleat 109' also makes it possible to take up forces exerted in directions Y and Z. As a result, these three wing system cleats that make up the attachment means enable an isostatic taking up of forces.

Figure 6:
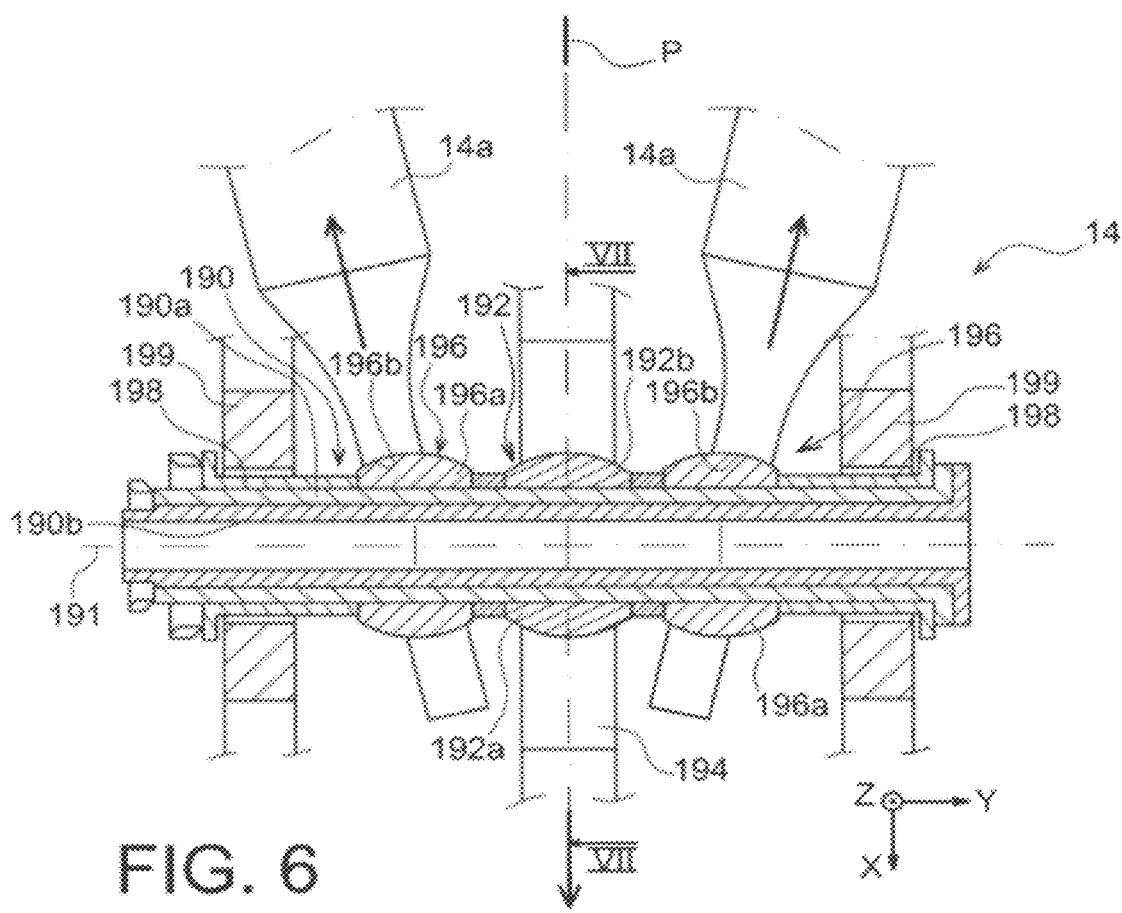
FIG. 6 shows an enlarged top view of the take-up device for thrust forces of the engine assembly shown in the preceding figures, according to an alternative embodiment.
Figure 7:
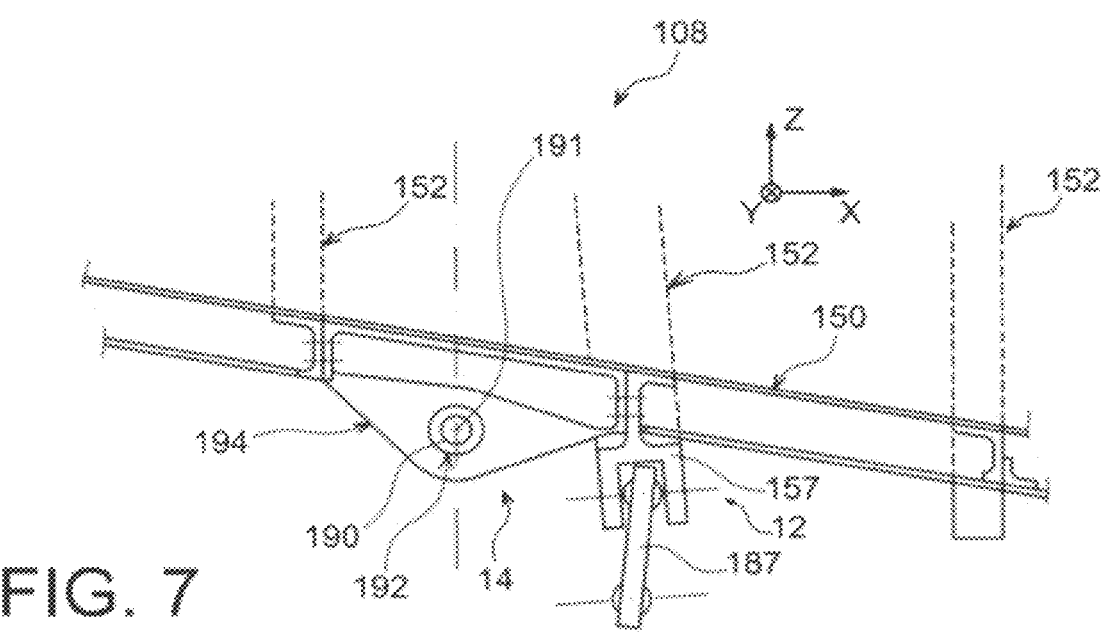
FIG. 7 shows a cross-sectional view along line VII-VII of FIG. 6.

FIGS. 6 and 7 show an alternative embodiment for the take-up device for thrust forces 14, which no longer comprises a rudder bar as was the case in the embodiment described above.

The device 14 nevertheless keeps two lateral connecting rods for take-up of thrust forces 14a, arranged symmetrically relative to the vertical and longitudinal median plane P of the pylon. These two connecting rods 14a traditionally travel forward and upward from the intermediate case of the engine on which their forward end is mounted, preferably hingedly. Still in a known manner, the hinge pins of the connecting rods 14a on the intermediate case are each substantially perpendicular to the shared plane in which the two connecting rods fit.

The device 14 comprises an axis system 190, oriented in direction Y, under the lower post of the box 150. This axis system for example comprises two concentric axes 190a, 190b, as diagrammed in FIG. 6. This doubling of the axis makes it possible to obtain a failsafe safety function, in the event one of the two breaks.

The axis system 190 supports three ball joints whereof the centers are aligned on the longitudinal axis 191 of the system 190, oriented in direction Y. These include a primary ball joint 192 made from a first male ball joint organ 192a, slid around the axis system 190, and a second female ball joint organ 192, integrated into a first fitting 194. The male and female organs naturally have complementary shapes so as to form the ball joint 192, this shape corresponding to a sphere symmetrically truncated by two planes parallel to each other and orthogonal to the axis 191.

The female ball joint organ 192b is either a piece fixedly attached on the fitting 194, or made in a single piece therewith. This same fitting 194 is fixedly mounted on the rigid structure 108, for example between two directly consecutive rib frames 152. As is visible in FIG. 7, the first fitting 194 can in fact have a base bearing and fastened on the lower side of the two rib frames 152, as well as on the part of the lower post of the box 150 situated between the two ribs. The mounting is preferably done by bolting on the box and the two concerned ribs, whereof the aft rib is preferably that integrating the fitting 157 of the aft engine attachment 12.

Two secondary ball joints 196 are also provided respectively arranged on either side of the primary ball joint 192, in a direction of the axis system 190. Each of them is made from a first male ball joint organ 196a, slid around the axis system 190, and a second female ball joint organ 196b, integrated at the aft end of one of the connecting rods 14a. The male and female organs here also have complementary shapes so as to form the ball joints 196, this shape corresponding to a sphere symmetrically truncated by two planes parallel to each other and orthogonal to the axis 191.

For each secondary ball joint, the female ball joint organ 196b is either a piece fixedly attached on the aft end of the connecting rod 14a, or made in a single piece therewith.

In the example shown in FIGS. 6 and 7, the three male ball joint organs 192a, 196a therefore each have a through orifice in direction Y, making it possible to slide around the axis system 190. Their translational maintenance relative to said system 190, in the direction of the axis 191, is ensured by the presence of two bushes 198 that are an integral part of the system 190, which press these organs 192a, 196a against each other. The latter also preferably bear directly on each other, as shown in FIG. 6.

The bushes 198 are maintained for one by the head of the axis system, and for the other by the nut of said system, arranged opposite the head.

Moreover, the device 14 has backup means making it possible to ensure the transmission of forces in case of failure. These means comprise two second fittings 199 fixedly mounted on the rigid structure 108, preferably on the lower post of the box 150. The two second fittings 199 are located at the lateral ends of the device 14, so that each secondary ball joint 196 is arranged between one of these second fittings 196, and the primary ball joint 192, in the direction of the axis system. Moreover, each second fitting 196 is passed through with play by the axis system 190, at the locking bushes 198. As seen in FIG. 6, the two fittings 196 extend in planes XZ, like the first fitting 194 situated between them.

Thus, in the normal flight configuration, the engine forces passing successively through the two connecting rods 14a, the two secondary ball joints 196, the axis system 190, the primary ball joint 192, the first fitting 194, and the rigid attachment pylon structure 108. The axis system 190 can then oscillate slightly along the center of the primary ball joint 192, preferably in the plane of the connecting rods, because the permanent balance of the forces passing through the two connecting rods. Nevertheless, the device 14 is designed so that the oscillations of the axis system have a low enough amplitude not to abut against the second fittings 199, by which no force passes under normal flight conditions.

Figure 8:
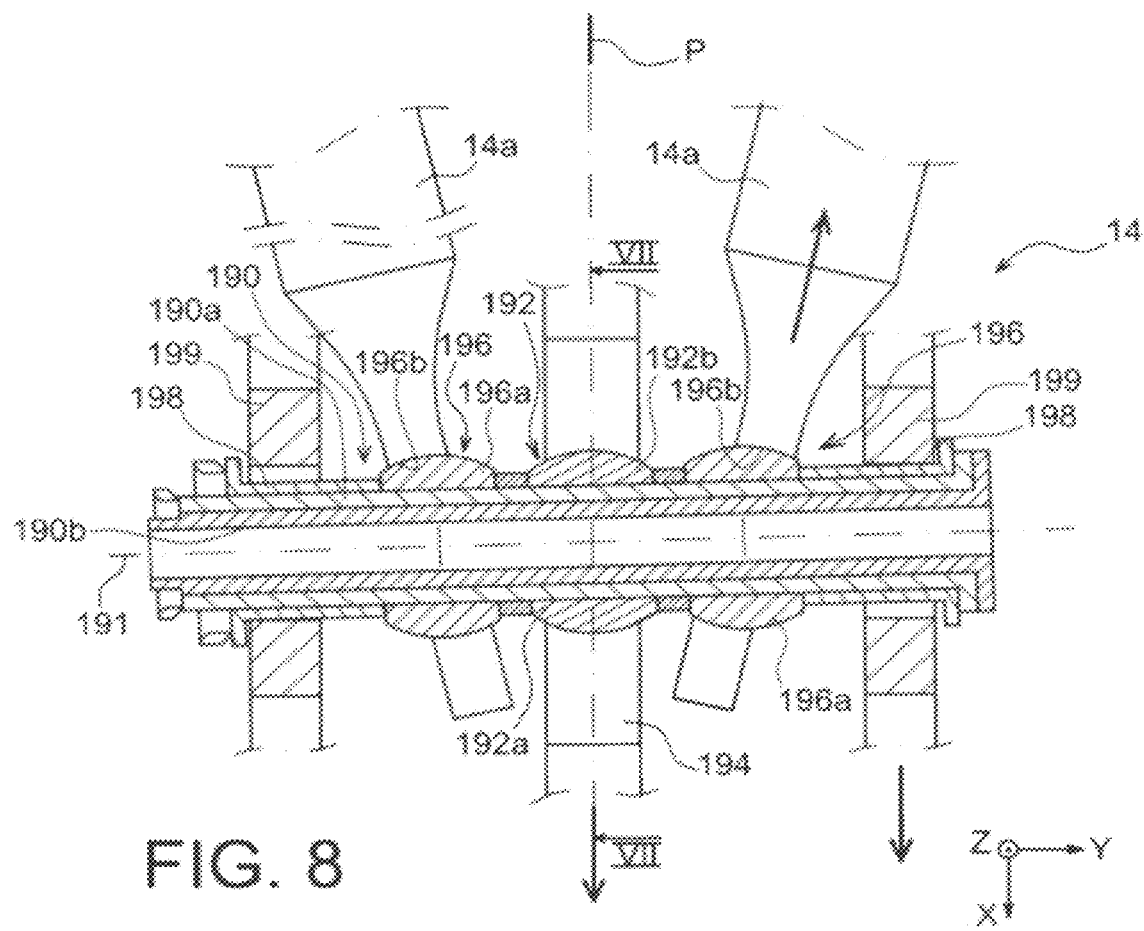
FIG. 8 shows a view similar to that of FIG. 6, in which the take-up device for thrust forces has been shown in a configuration as adopted after the accidental break of one of its two lateral connecting rods.

However, in the event of an accidental failure occurring on the force path between one of the connecting rods 14a and the axis system 190, such as for example the break of the left connecting rod in FIG. 8, the thrust forces then only pass through the other connecting rod, on the right. This leads first to only stressing the axis system 190 by the right connecting rod, which causes the system 190 to rotate around the center of the primary ball joint 192, until the initial play between the axis system 190 and the second fitting 199, associated with the active connecting rod, has been completely consumed.

After the quasi-instantaneous obtainment of the stop between these elements, the engine forces successively pass through the non-failing connecting rod 14a, the axis system 190, the two primary 192 and secondary 196 ball joints, the two fittings 194, 199, and the rigid structure 108 of the attachment pylon. The "failsafe" safety function is therefore fully ensured.

Of course, various changes can be made by one skilled in the art to the invention just described, solely as non-limiting examples. For example, it is in particular possible to indicate whether the engine assembly 1 has been presented in a configuration adapted so that it is suspended under the wing system of the aircraft, this assembly 1 could also assume a different configuration allowing it to be mounted above this same wing system.

The invention claimed is:

1. An aircraft assembly comprising:
a wing and an engine attachment pylon fixed to the wing by an attachment comprising a first and a second front wing system cleat connecting a rigid structure of the attachment pylon and a front longeron of the wing, the front longeron being inclined relative to each of the longitudinal and transverse directions of the pylon,
wherein said first wing system cleat comprises a first shearing pin oriented in the transversal direction to ensure take-up of forces exerted in the longitudinal and vertical directions of the pylon, and in that the second front wing system cleat comprises a second shearing pin oriented in the longitudinal direction to ensure take-up of forces exerted in the transversal and vertical directions of the pylon, and the second shearing pin penetrates the front longeron.

2. The assembly according to claim 1, wherein said second front wing system cleat comprises a pylon fitting secured to the rigid structure, a housing fitting of the pin secured to the front wing longeron and arranged between said front longeron and said pylon fitting, as well as a maintenance fitting of the pin for keeping the pin attached on the front wing longeron and arranged so that said pylon fitting is situated between said housing fitting of the pin and said maintenance fitting of the pin, the pylon fitting, the housing fitting, and the maintenance fitting are each passed through by said second shearing pin.

3. The assembly according to claim 2, wherein said pin maintenance fitting is oriented substantially in the transverse direction parallel to the pylon fitting, and said pin maintenance fitting is fixed to the front wing longeron directly at one of its ends, and indirectly at the other of its ends, via a connecting fitting.

4. The assembly according to claim 3, wherein the connecting fitting is oriented substantially in the longitudinal direction.

5. The assembly according to claim 2, wherein said second front wing system cleat comprises an additional housing fitting of the pin secured to the front wing longeron, and arranged so that the additional housing fitting of the pin is situated between said housing fitting of the pin and said additional housing fitting of the pin.

6. The assembly according to claim 1, wherein the rigid structure comprises a box, as well as transverse stiffening ribs of the box fixed on said box and spaced apart from each other along the box while being outwardly arranged relative to said box that they surround, and in that said pylon fitting is made in a single piece with one of said transverse ribs.

7. The assembly according to claim 1, wherein said attachment also comprise a rear wing system cleat ensuring taking-up of the forces exerted in the transverse and vertical directions of the pylon, and in that said attachment are exclusively formed by the two front wing system cleats and the rear wing system cleat.

8. An aircraft comprising at least one assembly according to claim 1, as well as an engine mounted on said assembly.

9. The assembly according to claim 1, wherein the front longeron includes a portion that extends between a top surface of the wing and a bottom surface of the wing, and the two front wing system cleats directly attach to the portion of the longeron.

* * * * *